Figure 1:
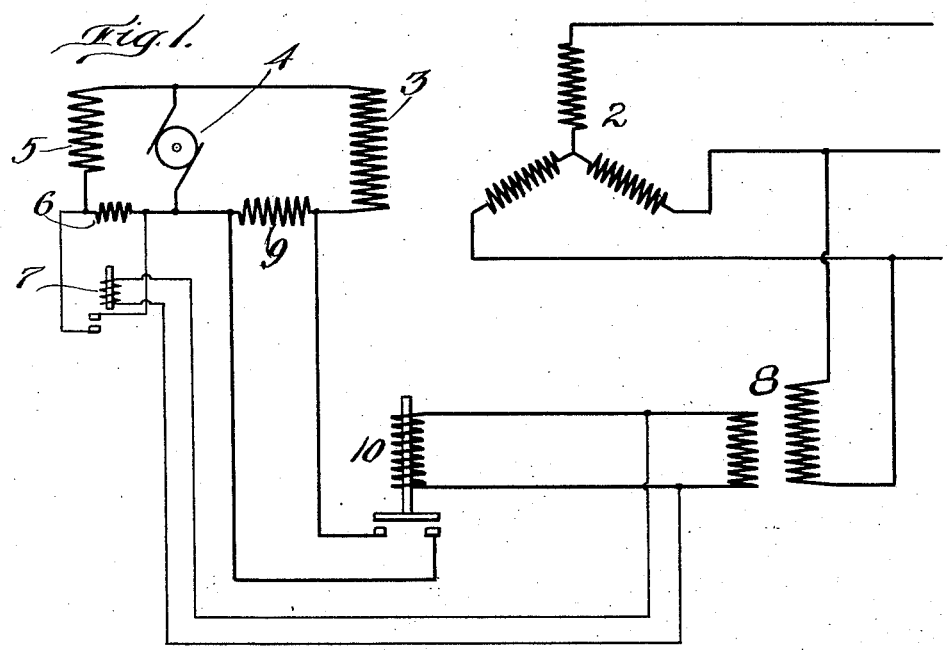

Patented Jan. 7, 1930

1,742,633

UNITED STATES PATENT OFFICE

RALPH DOUGLAS BOOTH, OF SALEM, NEW HAMPSHIRE, ASSIGNOR TO JACKSON & MORELAND, A COPARTNERSHIP CONSISTING OF DUGALD C. JACKSON AND EDWARD L. MORELAND, OF BOSTON, MASSACHUSETTS

APPARATUS FOR REGULATING ALTERNATING-CURRENT GENERATORS

Application filed January 12, 1925. Serial No. 1,872.

This invention relates to electrical systems of distribution of the alternating current type.

It is a common practice at the present time to use a synchronous condenser at the receiving end of a long transmission line to regulate the voltage at the end of the line. Such a condenser consists of an alternating current generator, the field of the alternator being regulated to produce the desired results. It is a common practice, also, to equip the exciter of such an alternator with a voltage regulator, the well known Tirrill regulator being usually employed, to vary the field of the alternator automatically in response to changes in terminal voltage. It has been found, however, that such a regulator is too slow in operation to give the requisite stability during periods of transient disturbance which tend to destroy synchronism. Such disturbances may be produced, for example, by switching or by short-circuits which immediately clear, and their duration may be very brief, say from half a second to two or three seconds. Transients of this character are particularly liable to destroy synchronism in a system which includes a long transmission line of two hundred miles in length, for example, and where, consequently, a heavy increase in load produces an excessive drop in voltage. In such a system a short-circuit, even if lasting only half a second, would be very likely to destroy synchronism before a voltage regulator could function.

The present invention deals with this condition, and it has for its chief object to improve the performance of alternating current generators whether used as condensers or otherwise. The invention aims particularly to devise means for building up the field of an alternator more quickly, when the terminal voltage drops for any reason, than has been possible heretofore.

The nature of the invention will be readily understood from the following description when read in connection with the accompanying drawings, and the novel features will be particularly pointed out in the appended claim.

Figure 2:
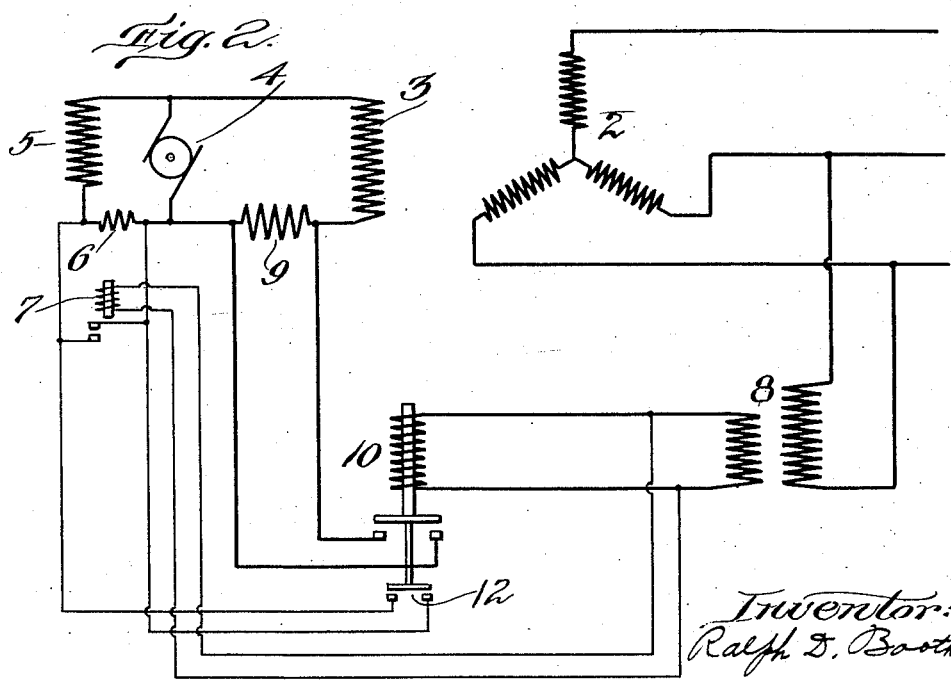

Referring now to the drawings,

Figure 1 is a diagrammatic view of an organization of apparatus embodying certain features of the present invention; and Fig. 2 is a similar view of a somewhat different embodiment of the invention.

Referring first to Fig. 1, the armature of an alternator is indicated at 2, the field of the alternator at 3, the armature of an exciter for supplying current to said field at 4, and the exciter field at 5. In series with the exciter field is a resistance 6 which is cut into or out of the field circuit automatically by means of a voltage regulator of the Tirrill type, a simplified form of which is indicated diagrammatically at 7. It will be understood that the complete circuit diagram of a Tirrill regulator would be quite complicated and such a diagram is not necessary to an understanding of the present invention. This regulator is connected through a potential transformer 8 to the terminals of the alternator so that the regulator is automatically responsive to changes in the terminal voltage of the alternator.

It will be observed that if a heavy increase in current should be suddenly imposed on the alternator 2, as for instance due to a transient short-circuit or by the switching in of additional load, the armature current can build up so much more rapidly than the regulator 7 can increase the field current that synchronism is likely to be destroyed in the very brief interval required for the Tirrill regulator to function and build up the field of the alternator.

The sudden increase in armature current creates a rise in current in the alternator field coil 3 due to the mutual inductance of the armature and field. This induced field current immediately begins to die out and under the conditions assumed would drop very considerably before the Tirrill regulator could cause the field current to build up. If, however, an increased voltage could be impressed instantly on the field while this induced current was still at a high value, it would prevent the serious drop in field current that otherwise occurs, and consequently, the time required to establish the higher field current necessary to hold up the terminal voltage under the increased load would be eliminated. The present invention accomplishes this result.

Referring again to Fig. 1, it will be observed that a resistance 9 is included in the circuit of the alternator field 3 and is arranged to be short-circuited by a low voltage relay 10, the solenoid of which is connected to the secondary terminals of the potential transformer 8. With this arrangement the drop in terminal voltage of the alternator caused by the sudden increase in line or armature current, closes the low voltage relay and short-circuits the resistance 9, thus instantly impressing a higher voltage on the field coil 3. This occurs while the increased current in the field coils induced by the armature reaction is at a maximum, or, at least, is at a high value. The relay 10 can readily be so designed, according to principles with which those skilled in this art are familiar, that it will function in less than a fifth of a second. It can also be so set that it will not function until a substantial drop in line voltage, say 10%, has occurred, and will open the relay switch and cut in the resistance 9 again when the terminal voltage has risen substantially to normal. With this arrangement, therefore, minor variations in voltage will be corrected by the voltage regulator 7 in the usual manner. Upon a more serious drop in voltage, however, the relay 10 will operate to reduce the field circuit resistance and therefore impress an increased voltage instantly on the field coils 3, this action taking place independently of the operation of the voltage regulator 7. When the terminal voltage of the alternator has risen to a predetermined value, the low voltage relay 10 will open, thus cutting in the resistance 9 which, in turn, will cause another reduction in voltage of the alternator, due to the weakened field. This, however, will be corrected gradually by the voltage regulator.

While both the low voltage relay 10 and the voltage regulator 7 will be brought into operation at substantially the same instant upon a serious drop in voltage, the effect of the voltage regulator on the current in the alternator field 3 will be considerably slower than that caused by the closing of the low voltage relay switch due to the fact that the exciter field must first build up before it can, in turn, build up an increased field in the alternator. It may be desirable under some circumstances to make the resistance 9 in two or more sections and to cut them out successively by low voltage relays.

Fig. 2 shows the same arrangement illustrated in Fig. 1 except that the low voltage relay 10 is provided with an auxiliary switch 12 for short-circuiting the contacts of the voltage regulator 7. With this arrangement the relay preferably would be made to close its switches at a voltage considerably below normal, as for example, at 90% of normal, and to open somewhat above normal, say, at 105% of normal. If the voltage should fall to 90% or below, both the relay 10 and the regulator 7 would be operated and the exciter and alternator fields would start to build up as before. When the alternator voltage again became normal the regulator contacts would open, but inasmuch as they are short-circuited by the switch 12, no effect on the fields would be produced. The alternator voltage, therefore, would continue to rise until it reached 105% of normal, at which point the relay switches would open and the voltage would immediately drop approximately to normal due to the introduction of the additional resistance 9 into the alternator field circuit. At this time, also, the short-circuit across the regulator contacts would be removed and the regulator would be put into operation, the alternator then being subject to the regulator action, as before. The sudden cutting in of the resistance 9 will not create any serious disturbance because the change in value of the field current cannot be accomplished abruptly.

It will now be appreciated that the invention provides a very simple means for preventing loss of synchronism due to transient disturbances of the general character mentioned. Also, that the organization of apparatus provided by the invention for accomplishing this result is very simple, is entirely automatic in its action, and is extremely reliable. It will also be understood that the invention is susceptible of embodiment in many forms, differing widely from each other in details, and that the arrangements shown and described herein are intended rather by way of illustration than limitation.

Having thus described my invention, what I desire to claim as new is:

In an electric current generating system, the combination of an alternator, means for supplying exciting current to the field of the alternator, an automatic voltage regulator arranged to vary the field current to compensate for small variations in the terminal voltage of the alternator, a resistance in series with said field, a low voltage relay responsive to changes of predetermined degree in the terminal voltage of the alternator, and circuit connections whereby said relay is operative to short-circuit both the voltage regulator and also said resistance upon a substantial drop in terminal voltage of the alternator.

RALPH DOUGLAS BOOTH.